Feb. 26, 1963   O. P. BURCH   3,078,885
PORTABLE POWER HAND-GUIDED SAW MOUNTING DEVICE
Filed Feb. 27, 1961   2 Sheets-Sheet 2

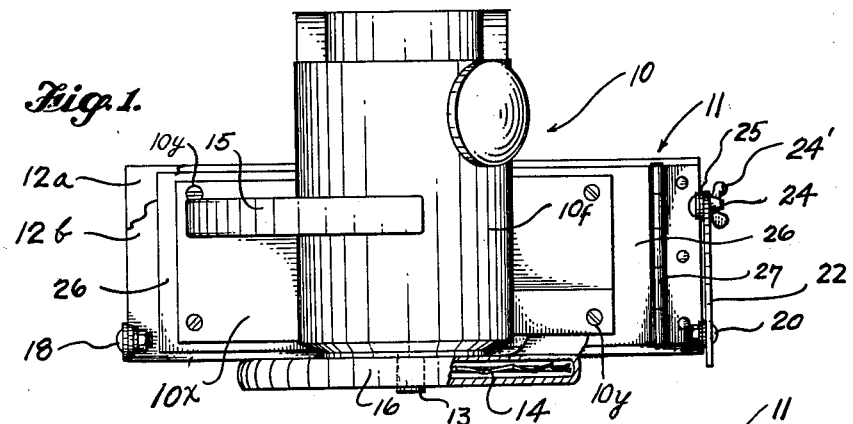
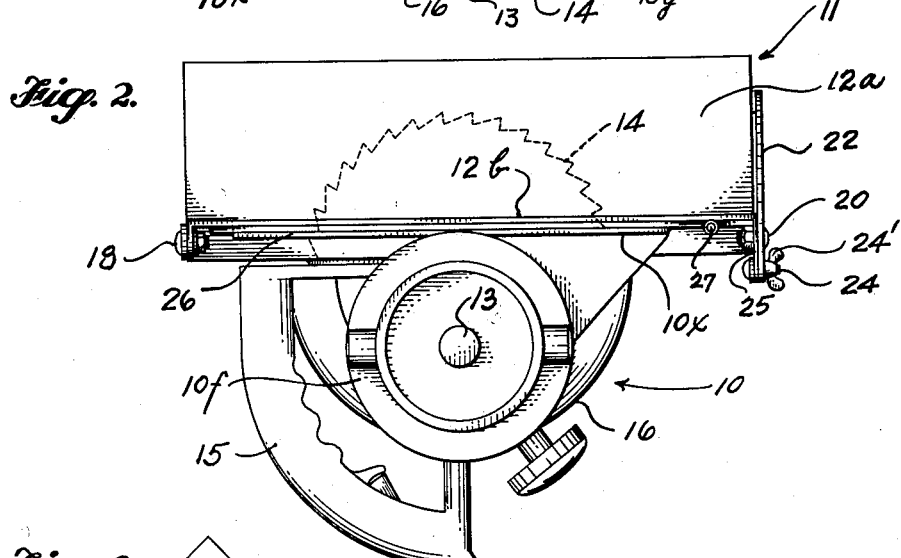
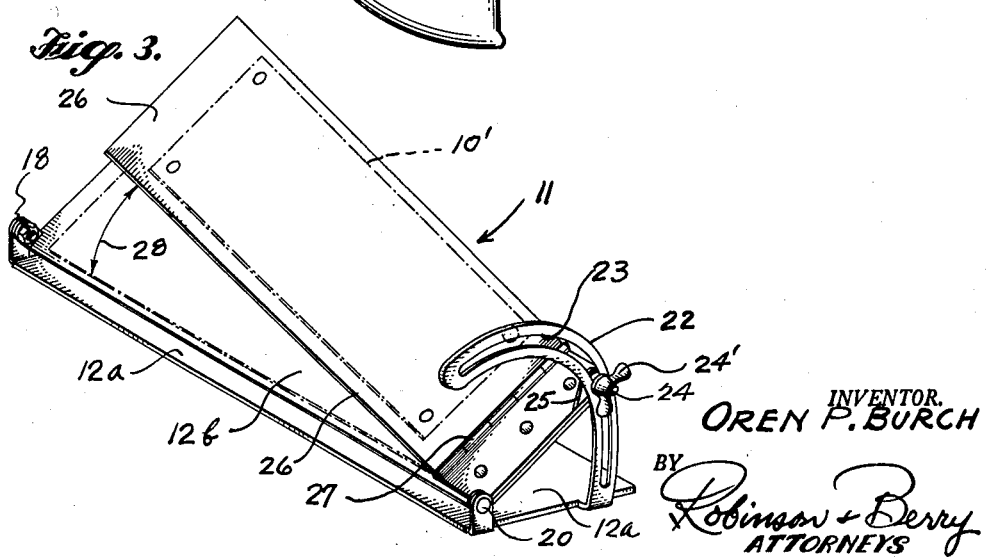

INVENTOR.
OREN P. BURCH
BY
Robinson Berry
ATTORNEYS

3,078,885
PORTABLE, POWER HAND-GUIDED SAW MOUNTING DEVICE
Oren P. Burch, Rte. 19, Box 62, Aberdeen, Wash.
Filed Feb. 27, 1961, Ser. No. 116,630
3 Claims. (Cl. 143—43)

This invention relates to wood sawing tools and has reference more particularly to a special form of mounting base for any of the power driven disk saws of present day design whereby that particular type or kind of saw can be advantageously employed as a hand tool for the sawing of slits through plywood panels, or the like, at predetermined sharp angles relative to the surface of the panel; such sawing being desirable in the present instance in order to render such panels sufficiently flexible for compound bending and thus to better adapt them for the shaping of the prow portions and bottoms of pleasure boats.

In a co-pending application for patent, filed on November 12, 1958, under Serial No. 773,372 issued April 18, 1961, as Patent No. 2,980,153, I have explained the desirability for using plywood panels for pleasure boat hull and bottom manufacture, and also have mentioned the difficulties of forming compound bends in plywood panels. In that same application, I have disclosed the angular slitting of a plywood panel to make it possible to obtain a desirable compound bend therein without difficulty and without detriment to the strength and utility of the panel.

The primary object of this invention is to provide a novel combination of power driven disk saw and a special form of saw mounting base; the combination being designed especially for use in the formation of angular or scarfed slits through plywood panels as is hereinafter disclosed.

It is a further object of this invention to provide a special form of mounting base for a power driven disk saw of the present day "skil saw" type for the scarf joint slitting of plywood panels; said mounting base including means for varying the angle of the saw relative to the plane of the base and the panel surface and for holding and guiding the saw by hand in the panel slitting operation.

It is another object of this invention to provide a saw mounting base that permits the saw to be properly positioned on the panel or piece in which the slits are to be made, and to then be swung into sawing contact therewith for the slitting operation, and to be swung outwardly from the slit and clear of the panel after the slit has been formed therein.

Further objects and advantages of the present invention reside in the details of construction of the various parts of the mounting base; in their combination and in the mode of use of the tool, as will hereinafter be fully described.

In accomplishing the above mentioned and other objects of the present invention, I have provided the improved details of construction, the preferred forms of which are illustrated in the accompanying drawings, wherein:

FIG. 1 is a top view of the slitting tool embodied by the present invention, showing it in what will herein be designated as its normal position of rest, that is, with the motor disposed with its axis in horizontal position.

FIG. 2 is a top view of the tool with motor swung to an axially vertical position.

FIG. 3 is a perspective view of the saw mounting base with the power saw removed therefrom for a better understanding of and better showing of the parts comprised by the base.

Figure 4:
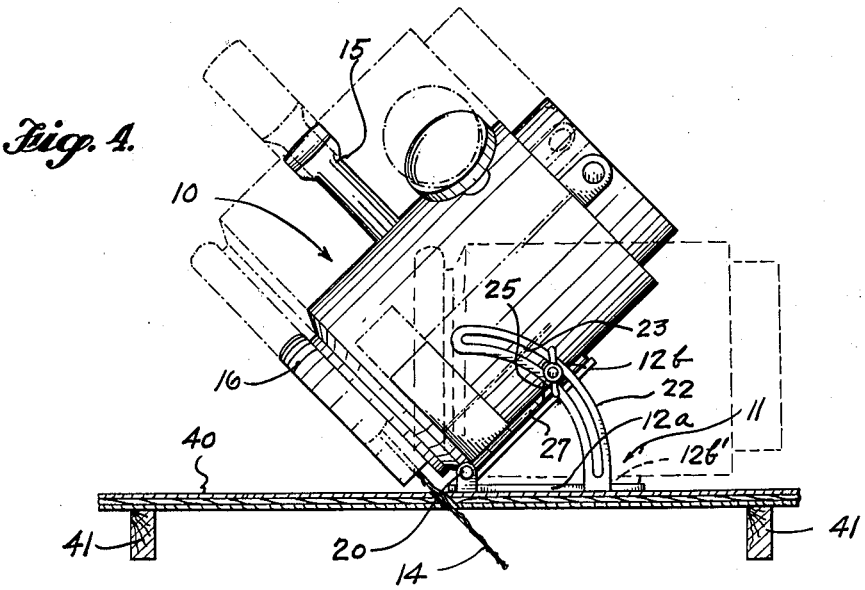
FIG. 4 is a forward end view of the base structure with the saw mounted thereon and as angled in scarf slitting of a panel.

It has been explained in the patent previously mentioned how the panel slits are filled and sealed and the panel finished to give strength and durability thereto. Therefore, the present application will not go into that aspect of the invention but will be confined to the combination tool as claimed.

Referring more in detail to the several views of the drawings:

Briefly described, the present device is a hand tool comprised of a power driven disk saw, herein designated in its entirety by reference numeral 10 and an adjustable saw mounting base structure, designated in its entirety by reference numeral 11 and shown apart from the saw in FIG. 3.

The saw 10 is herein shown to be typical of present day types of portable, hand operated power saws such, as for example, that known in trade as a "skil saw." It comprises a frame structure including a flat bottom plate 10x on which the motor housing 10f of the saw is fixedly mounted. This housing encloses the usual electric motor, not herein shown, from which one end of the motor drive shaft 13 extends. Fixed on the extended end of the motor drive shaft 13, in the usual or in any other satisfactory manner, is a disk saw 14 that operates in a plane that is perpendicular to the plane of the bottom plate 10x. A suitable handle 15 is fixed to the motor housing 10f, and the usual saw guard 16 is supported from the motor housing 10f and extends forwardly therefrom and is fixed at its forward end to plate 10x. This guard encloses only the upper peripheral edge portion of the disk saw 14, as has been shown in FIGS. 1 and 2. Plate 10x is secured at its four corners to plate 26 by means of machine screws 10y. The plates may also be joined by welding or other convenient means.

The saw mounting base structure 11 of this invention is best shown in FIG. 3 apart from saw 10. It comprises two flat, coextensive plates 12a and 12b of substantially the same dimensions, which plates are hinged together at two of their opposite end corners as shown at 18 and 20 in FIGS. 1, 2, 3 and 4, thus to permit the plate 12b to be hingedly adjusted from a position lying flatly on top of horizontal plate 12a as in dash lines 12b' in FIG. 4, to any angular position relative thereto from parallel to right angular. An arcuate segmental brace 22 is fixed at its lower end to an end edge of the bottom plate 12a and extends upwardly and curves laterally and across the corresponding end edge of plate 12b. The curvature of this brace, as seen in FIG. 4, is centered in axial line of the hinge bolts 18 and 20 and the brace is formed with a longitudinal slot 23 through which a bolt 24 is extended; this bolt being mounted by an ear 25 that is fastened to and extends from the end edge of plate 12b, as shown in FIG. 4. A wing nut 24' is applied to the bolt 24 for tightening against the brace to secure the plates 12a—12b at the desired angular adjustment.

Disposed flatly upon what is the top surface of plate 12b as seen in FIGS. 1 and 3 is a flat plate 26 which is hinged at one end only, as at 27 in FIG. 3, to the plate 12b, to permit it to be swung at its opposite or free end, directly from and toward plate 12b, as has been indicated in FIG. 3 by the double pointed arrow 28.

In assembling of the combination of saw 10 and base 11, the flat bottom plate 10x of the saw 10 is disposed flatly upon and fixed rigidly to the top or outer surface of the plate 26; its position of attachment being designated in FIG. 3 by the dash-dot line rectangle shown at 10' on the top surface of plate 26.

It will be best understood by reference to FIG. 4, that with the saw 10, mounted on its bottom plate 10x and with plate 10x fixed to hinged plate 26, the disk saw 14 will be disposed with its axial line at a right angle to the hinge axis of the plates 12a and 12b as provided by bolts 18 and 20 and will be so held as to operate in a plane perpendicular to the plane of plate 12b and parallel with the hinged edges of the two plates 12a and 12b.

When this tool is not in use, as in FIG. 1, the saw mounting plate 12b will ordinarily be swung downwardly and flatly against the top of plate 12a as in FIG. 1. Preparatory to use of the saw, the plate 12b will be swung upwardly from plate 12a as in FIG. 4 to dispose the saw disk 14 in the desired angular position, and secured by tightening the wing nut 24' to secure the adjustment.

Figure 5:
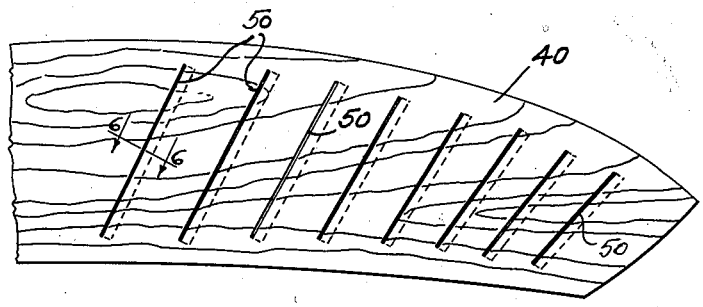
FIG. 5 is a portion of a plywood panel as shaped for use in the making of a boat hull and showing it as formed with a succession of scarf joint slits by means of the present tool.

The use of the present combination tool for the cutting of scarf slits through a plywood panel, generally one of ⅜" or ½" thickness, would be carried out as follows:

First the plywood or selected panel, designated in FIG. 4 by reference numeral 40, is disposed horizontally on suitable supports as indicated at 41. The slitting tool of this invention is then placed on the panel with the swinging plate 12b angularly adjusted relative to the horizontal or bottom plate and secured at the desired angle. The plate 26 is then swung upwardly about its hinge mounting 27 to the extent required to clear the lower edge of the saw blade from the panel surface and then, after the saw base has been adjusted by the user to align the saw blade with the line along which the panel is to be slit, the plate 26 is lowered to cause the lower periphery of the saw to engage the panel on the line of the cut. Before the motor is started, the saw is held clear of the panel and after it has been started, is lowered to cut through the panel as indicated in FIG. 4. Then, in the usual way, the user may advance and guide the saw along the mark to form the scarf slit to the extent desired. Slits formed in panel 40 are designated in FIGS. 5 and 6 by reference numeral 50. Then the saw may be swung upwardly to clear it from the panel and the tool lifted clear.

It is to be understood that with the disk saw 10 so mounted, slits may be cut in the panel at a 90° angle and to various lesser angles, down to approximately a 50° angle, depending somewhat on the saw design and its size.

It is to be understood also that the angle of the slit is established by the angular adjustment, setting and securing of plate 12b relative to base plate 12a. The subsequent swinging of plate 26 to lift or lower the saw from the panel does not change the angle of the cut.

Figure 6:
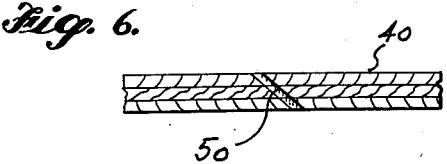
FIG. 6 is an enlarged sectional detail through the panel, taken on line 6—6 in FIG. 5 to show the angular direction of the scarfing slit as formed through the panel.

With the plywood panel so formed with the succession of slits, as in FIG. 6, it may be given a desired compound bend. When slitting and compound bending has been completed and secured, the slits may be filled and sealed as has been explained in my patent above mentioned.

It is not the intent that the present drawings and description shall in any way restrict the invention or claims, since it is to be understood that details of construction of the saw are not important so long as the saw mounting shaft 13 retains a fixed mounting relative to plate 12b, and that suitable means is provided for the control of the movement of the tool along a panel surface. The length and width of the base 11 is dependent to a certain extent on the size of the saw.

In the following claims, the plate 12a of the saw mounting base structure will be referred to as the "base plate"; the plate 12b will be referred to as the "saw angle establishing plate" and the plate 26 will be referred to as the "saw mounting plate." It is further to be understood that the hinge axis of the hinge 27 is on a vertical plane that is at a right angle to the hinge axis of the hinges 20—20.

What I claim to be new is:

1. In combination, a portable power driven disk saw and a mounting base structure to which the saw is secured in fixed relationship, said saw including a bottom plate, said mounting base structure including a rectangular base plate, a saw angle establishing plate overlying and hingedly secured to said base plate along one longitudinal edge thereof, a rectangular saw mounting plate having forward and rearward ends, said saw mounting plate overlying and hingedly joined at its forward end to said saw angle establishing plate and said bottom plate being secured in fixed position on said saw mounting plate with the saw disk parallel to and spaced outwardly from the longitudinal edge of said base plate along the edge thereof which is hingedly secured to said saw angle establishing plate.

2. The combination recited in claim 1 wherein means is provided on said base plate for effecting a releasable holding connection with said saw angle establishing plate to maintain the latter at any position of lateral tilting within its limits of adjustment.

3. A combination according to claim 2 wherein said means for effecting the releasable holding connection with said saw angle establishing plate comprises an arcuate arm fixed at its lower end to one end of said base plate and extending upwardly therefrom in an arc that is centered on the hinge axis of said base plate and saw angle establishing plate, a longitudinal arcuate slot formed in said arm, an ear formed on an end edge of the saw angle establishing plate for travel along said arcuate arm, a locking bolt fixed on said ear and extending through said arcuate slot and a wing nut applied to said bolt for clamping engagement with said arm to retain any adjustment of the saw angle establishing plate.

References Cited in the file of this patent

UNITED STATES PATENTS

| | | |
|---|---|---|
| 1,830,579 | Wappat | Nov. 3, 1931 |
| 1,830,580 | Wappat | Nov. 3, 1931 |
| 2,589,554 | Killian | Mar. 18, 1952 |
| 2,671,476 | Richards et al. | Mar. 9, 1954 |
| 2,677,399 | Getsinger | May 4, 1954 |
| 2,911,017 | Holder | Nov. 3, 1959 |
| 2,980,153 | Burch | Apr. 18, 1961 |